(No Model.)

R. GORTON.
SASH LIFT.

No. 468,869.  Patented Feb. 16, 1892.

Witnesses

Inventor
Robert Gorton

UNITED STATES PATENT OFFICE.

ROBERT GORTON, OF PLAINFIELD, NEW JERSEY.

SASH-LIFT.

SPECIFICATION forming part of Letters Patent No. 468,869, dated February 16, 1892.

Application filed January 29, 1891. Serial No. 379,551. (No model.)

*To all whom it may concern:*

Be it known that I, ROBERT GORTON, a citizen of the United States, residing in the city of Plainfield, county of Union, and State of New Jersey, have invented certain new and useful Improvements in Sash-Lifters, of which the following is a specification.

The object of my invention is to provide a sash-lifter having the screw or securing device formed in one piece with the lifting-hook or finger-piece, which may be cheaply made, readily applied to a sash, and have the requisite strength and rigidity. Accordingly I form the sash-lifter of a single piece of wire, so bent as to form the securing-shank, an extended bearing-surface, and an enlarged or extended lifting-loop or finger-piece.

Figure 1:
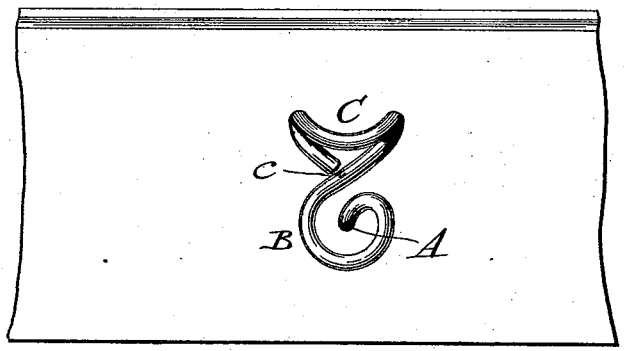
Figure 2:
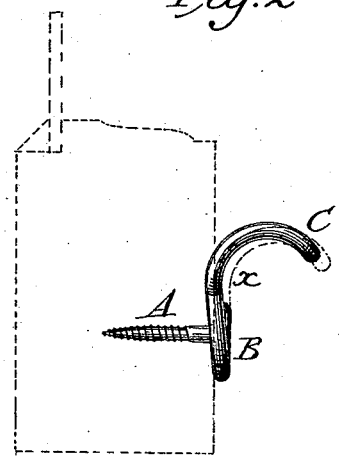

In the accompanying drawings, Figure 1 is a front elevation of my improved sash-lifter. Fig. 2 is a side elevation of the same, showing in dotted lines a portion of the window-sash to which the lifter is secured.

The lifting device is made of a single piece of wire having a screw-threaded securing-shank A, an extended bearing-surface B, and an enlarged or widened loop, finger-piece, or lifting-hook C. The bearing portion B is formed by bending the wire partially around the axis of the shank A, and the lifting-hook C is formed by bending the wire diagonally across the axis of the hook, then forwardly and backwardly to form the lifting-hook, the end of the wire terminating about midway between the ends of the diagonal piece c. As will be observed, that portion of the wire which forms the bearing-surface is not in contact with the shank, and the two sides of the finger-piece C are separated to a considerable extent. The bearing-piece B is preferably made slightly inclined, as shown at x, but when the device is secured to the window-sash the screw A will cause the bearing-surface B to flatten out, the parts B and C assuming the position shown by dotted lines, Fig. 2, and thus a spring-pressure is afforded which keeps the sash-lifter from turning or getting out of place after it has been screwed home to the desired position. By employing an extended bearing-surface the shank is maintained in a horizontal position, and its tendency to rise at its outer end and sink at its rear end in the sash is counteracted.

By my improvements there is not only great economy in the cost of manufacture of sash-lifters, but they may be quickly and securely fastened to a window-sash without the use of separate screws or screw-drivers or any other additional securing devices or tools.

I claim as my invention—

A sash-lifter formed of a single piece of wire having a horizontal screw-threaded shank, a bearing portion formed by bending the wire at the inner end of the shank laterally and carrying it around the axis of the shank, and a looped lifting-hook formed by continuing the wire from the bearing portion upwardly, outwardly, and then transversely to the axis of the shank, and then backwardly toward the shank, the curved part of the wire forming the bearing portion being out of contact with the shank and slightly inclined at x, as described, and the two sides of the lifting-hook or finger-piece being spread apart, substantially as described.

In testimony whereof I have hereunto subscribed my name.

ROBERT GORTON.

Witnesses:
E. H. YATES,
H. O. D. TERHUNE.